(12) United States Patent
Dilley et al.

(10) Patent No.: US 11,082,401 B2
(45) Date of Patent: *Aug. 3, 2021

(54) CLOUD BASED FIREWALL SYSTEM AND SERVICE

(71) Applicant: Akamai Technologies, Inc., Cambridge, MA (US)

(72) Inventors: John A. Dilley, Los Altos, CA (US); Prasanna Laghate, Santa Clara, CA (US); John F. Summers, Newton, MA (US); Thomas Devanneaux, Los Altos, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/266,335

(22) Filed: Feb. 4, 2019

(65) Prior Publication Data

US 2020/0007506 A1 Jan. 2, 2020

Related U.S. Application Data

(63) Continuation of application No. 14/998,187, filed on Dec. 24, 2015, now Pat. No. 10,243,952, which is a
(Continued)

(51) Int. Cl.
  *H04L 29/06* (2006.01)
  *H04L 29/08* (2006.01)

(52) U.S. Cl.
  CPC ...... *H04L 63/0263* (2013.01); *H04L 63/0218* (2013.01); *H04L 63/0227* (2013.01); *H04L 63/16* (2013.01); *H04L 67/10* (2013.01)

(58) Field of Classification Search
  CPC . H04L 63/16; H04L 63/0263; H04L 63/0218; H04L 63/20; H04L 63/205;
  (Continued)

(56) References Cited

U.S. PATENT DOCUMENTS 6,167,438 A    12/2000 Yates et al.
6,546,423 B1    4/2003 Dutta et al.
(Continued)

OTHER PUBLICATIONS

Strand, Lars, "Adaptive distributed Firewall using intrusion detection", University of Oslo Master Thesis, dated Nov. 2004, downloaded May 20, 2019 from https://www.duo.uio.no/bitstream/handle/10852/9220/larstra-master.pdf, 162.
(Continued)

*Primary Examiner* — Hosuk Song

(57) ABSTRACT

A cloud-based firewall system and service is provided to protect customer sites from attacks, leakage of confidential information, and other security threats. In various embodiments, such a firewall system and service can be implemented in conjunction with a content delivery network (CDN) having a plurality of distributed content servers. The CDN servers receive requests for content identified by the customer for delivery via the CDN. The CDN servers include firewalls that examine those requests and take action against security threats, so as to prevent them from reaching the customer site. The CDN provider implements the firewall system as a managed firewall service, with the operation of the firewalls for given customer content being defined by that customer, independently of other customers. In some embodiments, a customer may define different firewall configurations for different categories of that customer's content identified for delivery via the CDN.

8 Claims, 10 Drawing Sheets

Related U.S. Application Data continuation of application No. 13/896,995, filed on May 17, 2013, now abandoned, which is a continuation of application No. 12/965,188, filed on Dec. 10, 2010, now Pat. No. 8,458,769.

(60) Provisional application No. 61/285,958, filed on Dec. 12, 2009.

(58) Field of Classification Search
CPC ............. H04L 63/1416; H04L 63/1433; H04L 63/1441; H04L 63/1425; H04L 63/0281; H04L 63/0227; H04L 67/10
See application file for complete search history.

(56) References Cited

U.S. PATENT DOCUMENTS

| | | | |
|---|---|---|---|
| 7,055,173 B1 * | 5/2006 | Chaganty | H04L 41/0654 726/11 |
| 7,155,487 B2 * | 12/2006 | Yau | H04L 67/104 709/213 |
| 7,254,713 B2 | 8/2007 | Souza | |
| 7,296,292 B2 * | 11/2007 | Chang | H04L 63/0218 709/206 |
| 7,380,010 B1 | 5/2008 | Oran | |
| 7,707,305 B2 | 4/2010 | Afek et al. | |
| 7,774,456 B1 | 8/2010 | Lownsbrough et al. | |
| 8,099,588 B2 * | 1/2012 | Massimiliano | G06F 8/61 713/1 |
| 8,230,516 B2 * | 7/2012 | Davison | G06F 21/10 726/11 |
| 8,458,769 B2 | 6/2013 | Dilley et al. | |
| 8,510,826 B1 | 8/2013 | Reams, III et al. | |
| 8,825,830 B2 * | 9/2014 | Newton | G06F 15/173 709/223 |
| 10,243,925 B2 * | 3/2019 | Dilley | H04L 63/16 |
| 2010/0192201 A1 | 7/2010 | Shimoni et al. | |
| 2015/0007314 A1 | 1/2015 | Vaughan | |

OTHER PUBLICATIONS

U.S. Appl. No. 14/998,187.
U.S. Appl. No. 13/896,995.
Communication Under MPEP § 609.02, dated Feb. 4 2019, 2 pages.
U.S. Appl. No. 14/555,428.
U.S. Appl. No. 14/981,347.
Prolexic specimen for trademark application, printout of http://www.prolexic.com/ industries-dos-and-ddos-protection-media-telecom.html, 2 pages, dated Nov. 27, 2012.
Prolexic specimen for trademark application, printout of http://www.prolexic.com/solutions/cleanpipe/, 2 pages, dated Jul. 12, 2005.
Prolexic specimen for trademark application, printout of http://www.prolexic.com/solutions/cleanpipe/, 2 pages, dated Jul. 29, 2005.
Prolexic specimen for trademark application, printout of www.prolexic.com, 2 pages, dated Nov. 27, 2012.
Housley, R. , "Security Label Framework for the Internet", IETF, RFC 1457, May 1993, 14 pages.
Prolexic, "USPTO Trademark File and certificate", application filed Nov. 27, 2012, alleging use since 2004, 153 pages.

* cited by examiner

Application Layer Controls Configuration

Firewall Name: Test-Test

| En | ID | Group | Title | Action |
|---|---|---|---|---|
| ☑ | 950107 | Protocol Violations | URL Encoding Abuse Attack Attempt | Alert ▼ |
| ☑ | 950116 | Protocol Violations | Unicode Full/Half Width Abuse Attack Attempt | Deny ▼ |
| ☑ | 960011 | Protocol Violations | GET or HEAD requests with bodies | Deny ▼ |
| ☐ | 960012 | Protocol Violations | POST request must have a Content-Length header | Deny ▼ |
| ☐ | 960016 | Protocol Violations | Content-Length HTTP header is not numeric | Deny ▼ |
| ☐ | 960018 | Protocol Violations | Invalid character in request | Deny ▼ |
| ☐ | 960901 | Protocol Violations | Invalid character in request | Deny ▼ |
| ☐ | 960912 | Protocol Violations | Request Body Parsing Failed. %{REQBODY_PROCESSOR_ERROR_MSG} | Deny ▼ |
| ☐ | 960008 | Protocol Anomalies | Request Missing a Host Header | Alert ▼ |

Match Criteria

Digital Property Match: | www.foobar.com |

The digital property as it appears in your applications edge server configuration (for example, *.example.com or www.example.com), or a match on the digital property (for example, objects.example.com is a match when your digital property is *.example.com.). Multiple matches are space separated.

Paths: | /* |

Hide

Path entries must be URL encoded. Separate multiple paths with a space.
Path Example: /default.asp or /a%2Cb.htm
Multiple Path Example: /images/* /scripts/*

Default File: Enter Criteria for positive match

File Extensions: Enter Criteria for positive match | Enter Criteria for negative match Firewall Name: | Test-Test ▼ |

☑ Application Layer Controls
☑ Network Layer Controls

```
1.  <security:firewall.activate>on<security:firewall.activate>
2.
3.  <akamai:firewall-config>
4.
5.      <!--Rule 1: deny requests with "root.exe" in the url -->
6.      <match:regex string="%(AK_URL)" regex="root\.exe">
7.          <security:firewall.action>
8.              <reject>on</reject>
9.              <id>1</id>
10.             <msg>Fishy url</msg>
11.         <security:firewall.action>
12.     </match:regex>
13.
14.     <!--Rule 2: deny requests with "crawler" in user-agent-->
15.     <match:regex select="REQUEST_HEADER:User-Agent" regex="crawler">
16.         <security:firewall.action>
17.             < reject >on</reject>
18.             <id>2</id>
19.             <msg>Fishy user-agent</msg>
20.         <security:firewall.action>
21.     </match:regex>
22.
23. </akamai:firewall-config>
```

Fig. 8

CLOUD BASED FIREWALL SYSTEM AND SERVICE

This application is a continuation of U.S. application Ser. No. 14/998,187, filed Dec. 24 2015, which is a continuation of U.S. application Ser. No. 13/896,995, filed May 17, 2013, which is a continuation of U.S. application Ser. No. 12/965,188, filed Dec. 10, 2010 (now U.S. Pat. No. 8,458,769), which claims the benefit of priority of U.S. Provisional Application No. 61/285,958, filed Dec. 12, 2009, the disclosures of all of which are hereby incorporated by reference.

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright rights whatsoever.

FIELD OF THE INVENTION

The present invention generally relates to a cloud-based firewall system and service, including in particular such systems and services implemented on in edge-computing or other distributed computing systems.

BACKGROUND OF THE INVENTION

Distributed computer systems are known in the art. One such distributed computer system is a "content delivery network" or "CDN" that is operated and managed by a service provider. The service provider typically provides the service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. Typically, "content delivery" means the storage, caching, or transmission of content, streaming media and applications on behalf of content providers, including ancillary technologies used therewith including, without limitation, DNS request handling, provisioning, data monitoring and reporting, content targeting, personalization, and business intelligence. Typically, the term "outsourced site infrastructure" means the distributed systems and associated technologies that enable an entity to operate and/or manage a third party's Web site infrastructure, in whole or in part, on the third party's behalf.

In a known system, such as shown in FIG. 1, a distributed computer system 100 is configured as a CDN and is assumed to have a set of machines 102 distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to content servers (also referred to as "edge servers") running on the machines 102. Typically, content providers offload their content delivery by aliasing (e.g., by a DNS CNAME) given content provider domains or sub-domains to domains that are managed by the service provider's authoritative domain name service, more details of which are set forth in U.S. Pat. Nos. 7,293,093 and 7,693,959, the disclosures of which are incorporated by reference herein. End users operating client machines 122 that desire the content are directed to the distributed computer system 100, and more particularly to one of its machines 102, to obtain that content more reliably and efficiently.

The distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers. More about the distribution of control information in a CDN can be found in U.S. Pat. No. 7,240,100, the disclosure of which is hereby incorporated by reference in its entirety.

As illustrated in FIG. 2, a given machine 200 comprises commodity hardware (e.g., an Intel Pentium or other processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine typically includes one or more media servers, such as a Windows Media Server (WMS) or Flash server, as required by the supported media formats.

Client machines 122 include conventional personal computers, laptops, other digital data processing devices. Client machines also include mobile clients, which may include any a variety of mobile devices, often referred to as smartphones or personal digital assistants (PDAs).

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057, the disclosure of which is incorporated herein by reference, illustrates a useful infrastructure for delivering and managing edge server content control information, such as that for controlling file purge requests.

The CDN may include a storage subsystem (NetStorage), such as described in U.S. Pat. No. 7,472,178, the disclosure of which is incorporated herein by reference.

The CDN may operate a server cache hierarchy (Cache-H) to provide intermediate caching of customer content; one such cache hierarchy subsystem is described in U.S. Pat. No. 7,376,716, the disclosure of which is incorporated herein by reference.

For live streaming delivery, the CDN may include a delivery subsystem, such as described in U.S. Pat. No. 7,296,082, the disclosure of which is incorporated herein by reference.

The CDN may provide secure content delivery among a client browser, edge server and customer origin server in the manner described in U.S. Publication No. 2004/0093419 and/or U.S. Pat. No. 7,363,361, the disclosures of which are both incorporated herein by reference. Secure content delivery as described therein enforces SSL-based links between the client and the edge server process, on the one hand, and between the edge server process and an origin server process, on the other hand. This enables an SSL-protected web page and/or components thereof to be delivered via the edge server.

SUMMARY

Disclosed herein is a cloud-based firewall system and service that protects customer origin sites from attacks, leakage of confidential information, and other security threats. Such a firewall system and service may be implemented in conjunction with a content delivery network (CDN) having a plurality of distributed content servers.

For example, in one illustrative embodiment of the invention, there is provided a method of content delivery in a CDN operated by a content delivery network service provider (CDNSP) on behalf of participating content providers. The participating content providers identify content to be delivered over the CDN. The content delivery method involves receiving first firewall settings from a first participating content provider that specify how a firewall is to operate with respect to requests for content identified by that first participating content provider for delivery over the CDN. Other, potentially different, firewall settings are received from a second participating content provider that specify how a firewall is to operate with respect to requests for content identified by that second participating content provider for delivery over the CDN. The settings are sent to various content servers in the CDN in a metadata configuration file, or other form. At one of those content servers, there is received a first request for content identified by the participating content provider for delivery over the CDN. The content server evaluates the first request using a firewall configured with the one or more first firewall settings. A second request is received for content identified by the second participating content provider for delivery over the CDN. The second request is evaluated using a firewall configured with the one or more second firewall settings.

In related embodiments, in a method as described above, evaluation of the first request using a firewall configured with the one or more first firewall settings involves testing the first request against one or more criteria. Evaluation of the second request can proceed similarly. If criteria are met, an action can be taken, such as denying the request, generating an alert, modifying the request, stopping processing the request, and logging the request.

The firewall settings can include IP addresses for which a particular action is taken, e.g., traffic from particular IP addresses may be blocked, or traffic from those addresses may be allowed with all other traffic blocked. Hence, the firewall may apply security at the application layer (to HTTP requests, and others), the network layer, and/or other layers.

In another illustrative embodiment of the invention, there is provided a method of content delivery in a CDN which involves receiving a first firewall configuration and second firewall configuration (e.g., each with one or more firewall settings) from a participating content provider. The participating content provider also specifies usage criteria that set forth whether the first firewall configuration is to be used for evaluating a content request, and usage criteria that set forth whether the second firewall configuration is to be used for evaluating a content request. The usage criteria may take into account such characteristics as a domain name in a request, subdomain in a request, URL of a request, content type requested, file name of requested content, file extension of requested content.

Continuing the foregoing example, these settings and usage criteria are sent to the content servers in the CDN. At one of content servers, a request is received for content of the participating content provider. Based on the request and the first firewall usage configuration criteria, the content server determines whether the first firewall configuration is to be used, and if so, evaluates the request using a firewall configured with the first firewall configuration. Based on the request and the second firewall usage configuration criteria, the content server determines whether the second firewall configuration is to be used, and if so, evaluates the request using a firewall configured with the second firewall configuration. Additional features and characteristics are set forth throughout this disclosure.

BRIEF DESCRIPTION OF THE DRAWINGS

The invention will be more fully understood from the following detailed description taken in conjunction with the accompanying drawings, in which:

FIG. 5 is an example of a user interface for selecting application layer settings to configure a firewall;

FIG. 7 is an example of a user interface for designating match criteria to identify those digital properties and/or files to which a particular firewall configuration will apply;

FIG. 8 is an example of code that configures a firewall;

DETAILED DESCRIPTION

The following detailed description sets forth embodiments to provide an overall understanding of the principles of the structure, function, and use of the methods and systems disclosed herein. The methods and systems described herein and illustrated in the accompanying drawings are non-limiting examples; the scope of the present invention is defined solely by the claims. The features described or illustrated in connection with one exemplary embodiment may be combined with the features of other embodiments. Such modifications and variations are intended to be included within the scope of the present invention. All patents, publications and references cited herein are expressly incorporated herein by reference in their entirety.

Figure 1:
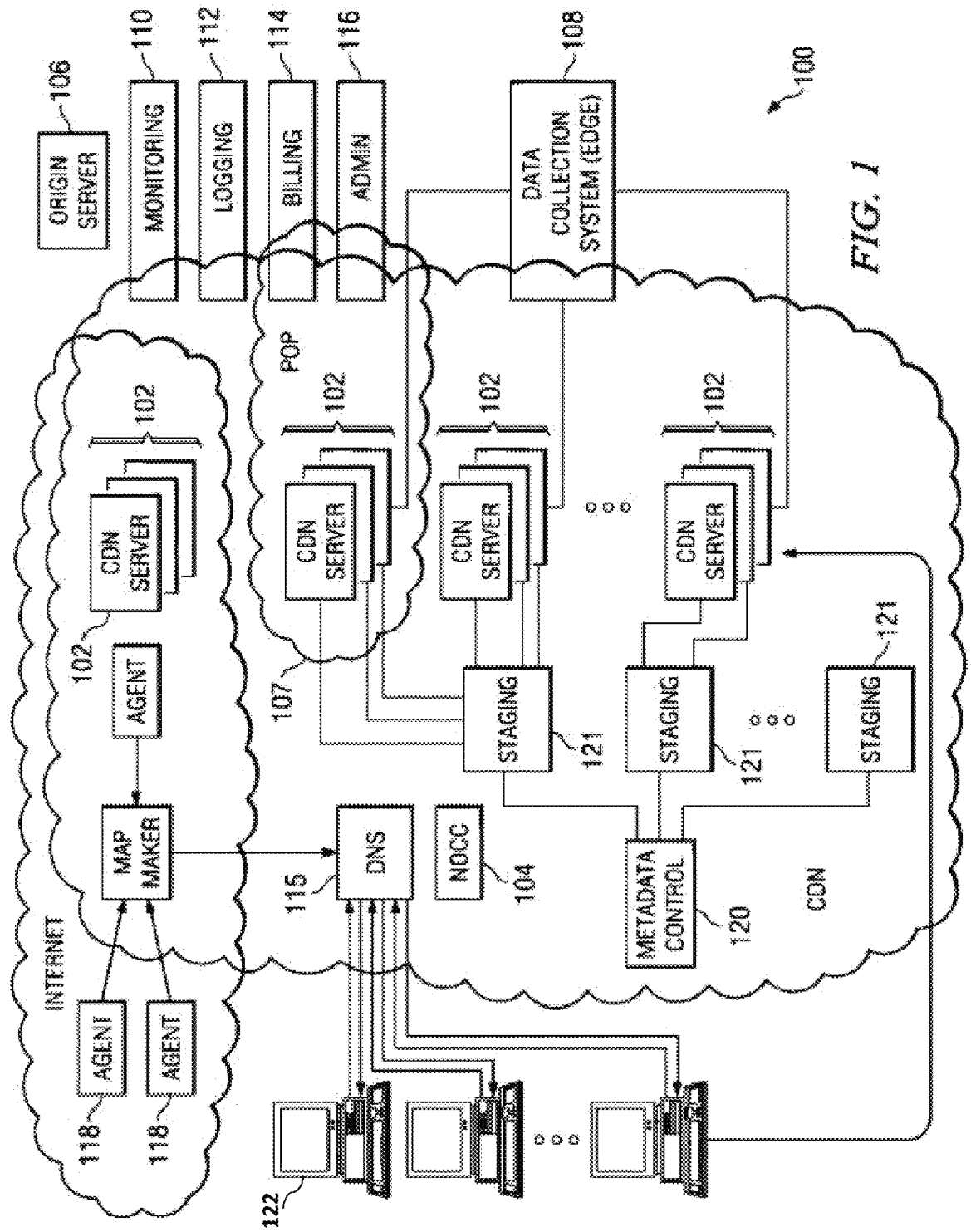
FIG. 1 is a block diagram of a content delivery network in which the present invention may be implemented.
Figure 2:
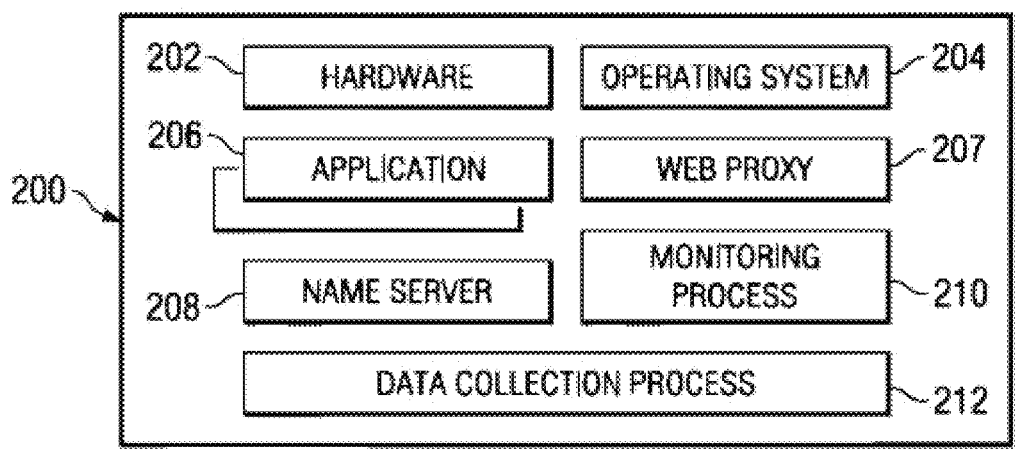
FIG. 2 is a simplified block diagram of a content server in a CDN.

The methods and systems disclosed herein may be implemented in a distributed computer system, e.g., a content delivery network ("CDN") as illustrated in FIGS. 1-2, and will be described with respect to such a CDN. However, they are not limited to such implementations. The distributed and shared network infrastructure described herein can be used, among other things, to deliver content from a plurality of Web sites.

Figure 3:
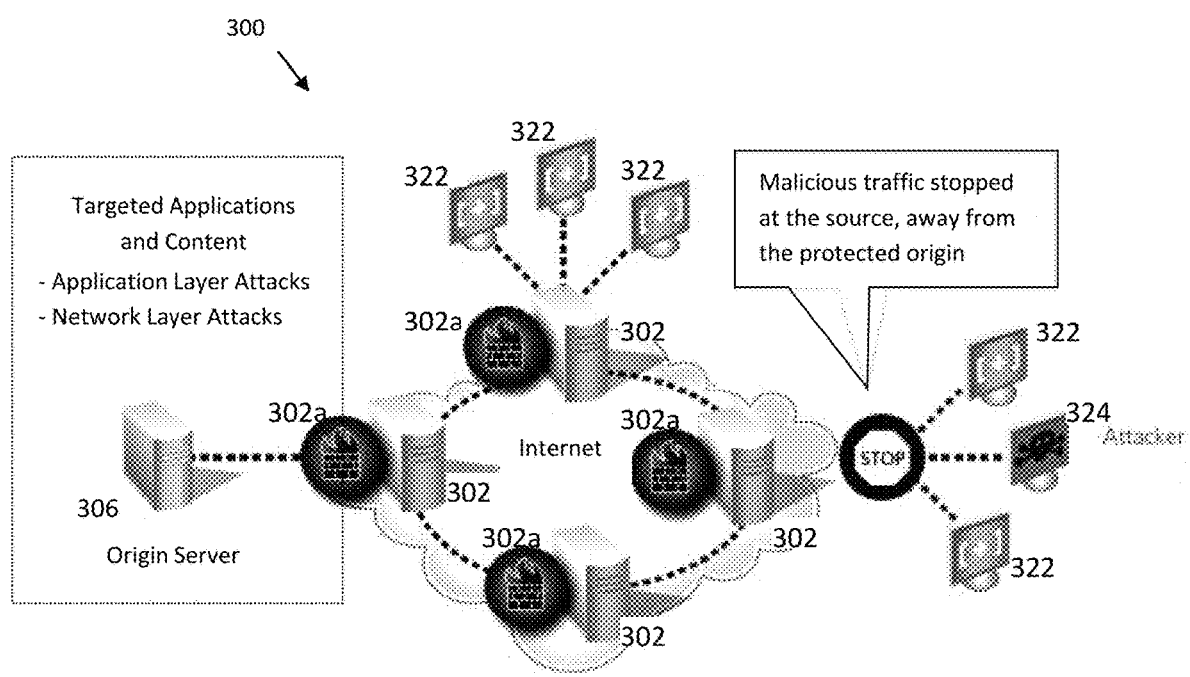
FIG. 3 is a diagram of a distributed, cloud-based firewall system in accordance with one embodiment of the invention.

FIG. 3 illustrates a distributed, cloud-based firewall system 300 and service in accordance with one embodiment of the invention. Content servers 302 are distributed around the Internet as part of a CDN, as discussed above in connection with FIGS. 1-2. In this system 300, each content server 302 includes and/or is coupled to a firewall 302a. The firewalls 302a inspect and filter traffic, and are configured to block or pass traffic based on specified security criteria. The firewalls 302a may operate at the application layer, network layer, or at other computer networking layers. The firewalls 302a may be implemented in hardware, software, or a combination thereof.

Client machines 322 desiring content from the origin server 306 are directed to one of the content servers 302. The requests (e.g., an HTTP or HTTPS request) are examined at the network edge by the firewalls 302a, which are configured to examine the traffic for attacks, leakage of information, or other kinds of security risks. Requests that pass the firewalls 302a are processed normally, with the requested content being served from content server's 302 cache, or being retrieved by the content server 302 from the origin server 306 for delivery to the client machine 322, or otherwise dealt with. Requests that are identified as attacks or other security threats (such as those from attacker machine 324) trigger the firewall 302 to take certain action, e.g., blocking the request, logging it for alert, or otherwise. Hence, threats are identified and blocked or otherwise addressed by the system 300 closer to the source and before reaching the origin server 306, offloading that burden from the origin server 306. In the case where the servers 302 are located at the network "edges", the firewalls 302a address those threats at the network edge. It should be noted that the origin server 306 may employ its own centralized firewall, intrusion detection/protection system, or other security system, in addition to the firewall system deployed on the content servers 302.

Although the CDN provider can configure the firewalls 302a (e.g., with a default setting or otherwise), the system 300 allows the content provider associated with the origin server 306, as a customer of the CDN, to configure the firewall settings that will apply to requests for content of that content provider.

Because the firewall module is implemented in multiple ghost processes throughout the CDN, the solution illustrated in FIG. 3 is a "distributed firewall" that provides a highly scalable, outer defensive ring for Web application protection. The solution is highly configurable through the metadata configuration techniques described herein. The module, through the implementation of Network and Application Layer controls, helps prevent threats and exploitation techniques, such as SQL Injection, Cross Site Scripting (XSS) and other HTTP attacks.

By implementing the subject matter described herein in a distributed network such as a CDN, a CDN service provider provides a firewall managed service. The service provides a scalable edge defense system for blocking, among other things, Web application attacks in the cloud. The firewall service provides CDN customers with a unique approach to easily and economically defend their Web applications. With no hardware to manage or maintain, CDN customers manage their own security rule set through the CDN service provider's customer (extranet) portal. Additionally, the firewall service helps enable Payment Card Industry (PCI) Data Security Standard compliance. The infrastructure is shared across multiple CDN customers, but each customer can provision and manage its own firewall to protect against attacks.

With the foregoing overview, the subject matter hereof will now be described in more detail.

1.0 Cloud-Based Firewall

Cloud-based Firewall (CF) is a security module for content delivery network customers. The CF module applies a rules-based evaluation of requests to scan for suspicious behavior, such as protocol violations, HTTP policy violations, request limit violations, robots, Trojan backdoors, generic attacks (such as cross-site scripting, various injection attacks, and so forth), outbound content leakage (server banners), and several other categories.

Compliance with payment card industry data security standards (PCI-DSS) requires an application firewall be used by companies who process payment card transactions to monitor and protect the origin infrastructure from the many existing web interface attacks that currently exist. The CF module can be used in conjunction with a PCI module to help customer's meet these PCI compliance requirements. The CF solution protects an origin server for requests that route through the CDN servers; an additional means of protecting the origin may be utilized as well. One such solution is described in U.S. Pat. No. 7,260,639, the disclosure of which is incorporated herein by reference.

Preferably, the Cloud Firewall is based on a set of core rules (e.g., a rule set available from Breach Security Labs, e.g., ModSecurity v1.6). ModSecurity applies a broad set of match criteria to HTTP requests to identify behaviors that can be classified as attacks, leakage of information or other kinds of security threats. The Core Rule Set defines security rules as well as configuration parameters for the Apache web server. On a high level, a security rule is an expression associated with data. The expression is usually the combination of an operator, variables and translations, which yields a Boolean. An expression can also be a logical OR or AND between other expressions, or the negation of another expression. The data for each rule consists of an identifier (or "id"), a tag, a message, a flag that tells if the request should be denied, a severity level, etc.

As noted above, preferably the firewall leverages a rule set, such as open source ModSecurity Core Rule Set supported by Breach Security, which defines common and harmful types of attacks and exploitation techniques, such as SQL Injection, Cross Site Scripting (XSS) and other Open Web Application Security Project (OWASP) Top-10 attacks. Other rule sets may be utilized.

These core rules (or a subset thereof) are converted into a metadata functional solution, with control metadata being delivered to and applied at the CDN servers in the manner described in U.S. Pat. No. 7,240,100, the disclosure of which is incorporated herein by reference. In particular, preferably the metadata is provisioned via a customer-facing extranet portal (e.g., via a Web-based user interface) and provided to the content servers within a metadata configuration file. Because the configuration file may need to change frequently (to deal with attack scenarios), preferably the CF-related metadata configuration is delivered to CDN content server processes using a dedicated and fast communication channel. See, U.S. Pat. No. 7,149,807 (the disclosure of which is incorporated herein by reference) for a useful communication infrastructure that may be used for this purpose. In some embodiments, the deployment of the configuration files throughout the distributed system can be accomplished within a short period of time, advantageously enabling real-time response to attacks.

The CF metadata configuration file should be ready for lookup when the firewall is activated on a particular content server. As will be described below in connection with FIG. 8, several tags and features are provided in the metadata structure so that the CDN content server process (ghost) can support the rule set processing.

2.0 Configuration Overview

Figure 4:
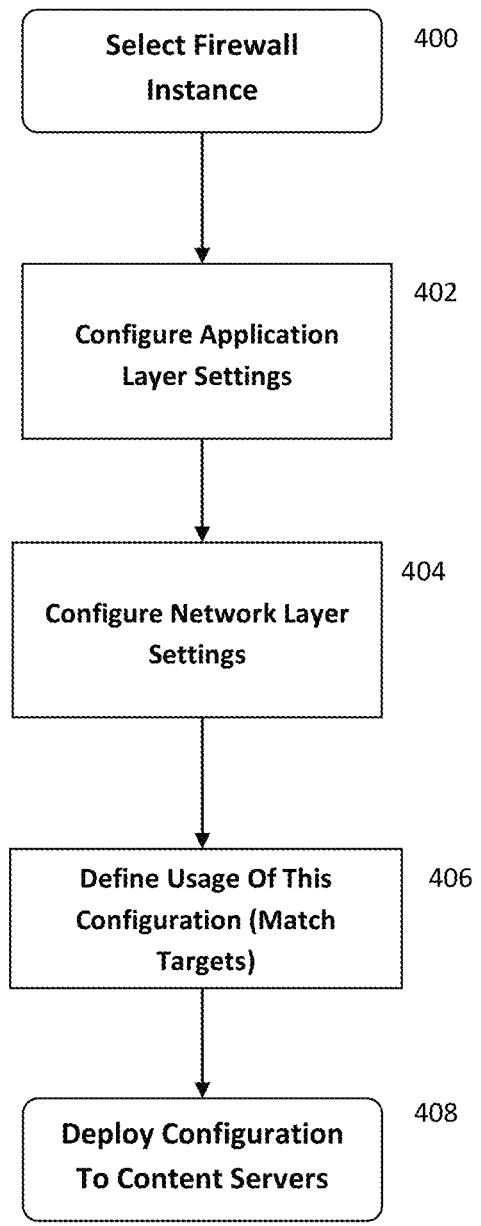
FIG. 4 is a flowchart illustrating configuration of a firewall in accordance with one embodiment of the invention.

FIG. 4 illustrates the configuration process. In step 400, a firewall instance is created or selected (for previously configured firewalls). In step 402, the application layer settings are configured. The filtering functionality of the firewall is controlled by setting up criteria that define attacks or other kinds of security threats, using which the firewall will examine traffic. (In alternate embodiments, criteria may be implemented to define safe or "trusted" traffic, e.g., traffic from a particular source or with a particular signature. For convenience of description, the term "security criteria" is used hereinafter to refer to, collectively, the foregoing kinds of criteria.) Security criteria may be chosen by selecting/enabling predefined rules from rule-sets, or, alternatively, by directly authoring Boolean expressions or other logic explicitly. FIG. 5 illustrates a user interface for selecting predefined rules that will apply to a firewall instance identified as "Test-Test." The user interface also permits selection of actions which the firewall is to take upon detecting traffic meeting the security criteria.

Figure 6:
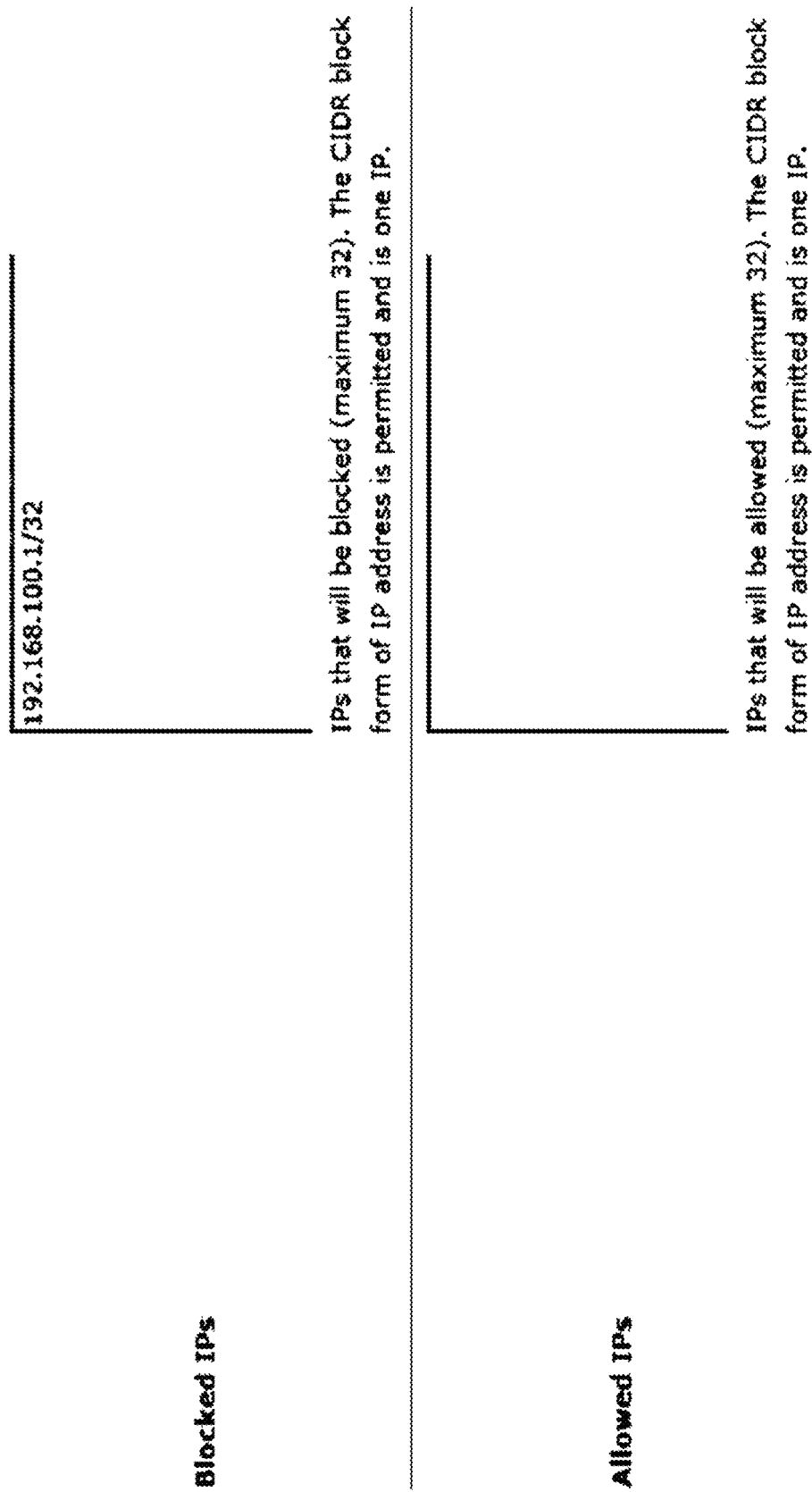
FIG. 6 is an example of a user interface for selecting network layer settings to configure a firewall.

In step 404, settings for the network layer are configured. Such settings may include a designation of IP addresses to block (blacklist) or other security criteria. Settings may also include, for example, a designation of a whitelist consisting of IP addresses of hosts/networks to grant access without further inspection, or other rules based on the information received in the request for content. FIG. 6 illustrates a user interface for configuring the network layer settings by entering IP addresses individually or in CIDR (classless inter-domain routing) notation.

A particular configuration of the firewall may be used to evaluate some requests for content, but not others. In step 406, usage of the configuration is defined. This can be accomplished by designating criteria indicating that the configuration will apply, referred to as Match Targets. For example, the settings shown FIGS. 5 and 6 may be applied only to requests for content from selected domains or subdomains, or can be applied only to requests for certain kinds of content (e.g., those with specified file extensions, or with other characteristics). FIG. 7 illustrates a user interface for specifying such criteria.

The process of configuring the firewall may also include defining rules for the transport layer (for example, the firewall may be configured to treat traffic using TCP differently than traffic using UDP or other protocols) or other networking layers. Although typically a firewall configuration will apply uniformly across content servers for a given customer, in alternate embodiments the firewalls operating on different content servers may be configured differently for the given customer.

In step 408, the configuration of the firewall is deployed to content servers in the CDN (e.g., by deploying a metadata configuration file over a communication channel, as described above).

2.1 Configuration Files

In a preferred embodiment, the CF module involves two configuration files: (1) a CF rules configuration file that manages the application and network rules, as well as Real-Time-Reporting configuration (referred to herein as a "CF metadata configuration file" or "CF rules configuration file"). (2) Standard alternative resource locator (ARL) configuration file that manages the site's settings (referred to herein as a "master configuration file"). Alternate embodiments may not use dual configuration files or use configuration files at all.

2.2 CF Rules Configuration File

Preferably, a CDN customer who is contracted for CF has only one CF configuration file. Through the use of Firewall Instances and Match Targets, separate CF policies can be applied to different digital properties and URLs with this single file. This does provide some additional flexibility that can allow different firewall policies to be applied to different URLs on the same digital property AND allow the same firewall policy to be applied to other properties, as well. The CF rules configuration preferably contains several components:

Firewall Instances—the settings to apply to the match target.
  Application Layer Controls configuration
  Network Layer Controls configuration
  Real-Time Reporting configuration (RTR)
Match Targets—the criteria used to determine if the Firewall instance needs to be applied.
  Match targets
  Firewall instance to apply
  Apply Application Layer Controls
  Apply Network Layer Controls 2.3 Firewall Instances A Firewall Instance represents the grouping of enabled controls which are to be applied to a request when the specific instance is evoked based on the Match Target criteria. In one implementation, a Match Target can evoke only one Firewall Instance. The Match Targets may be processed such that the bottom match wins and the appropriate Firewall Instance is used. The Match Targets may also be processed according to a hierarchy, such that a Match Target (and associated firewall configuration) that applies to domain is trumped by a Match Target applying to a sub-domain, which is trumped by a Match Target applying to a particular content type, and so forth.

Application Layer Controls define the security criteria to be checked with each request and the action to take if the attack is identified. Possible actions are Alert (do not deny the request, only generate an alert and continue processing the HTTP request) and Deny (deny the request, resulting in a HTTP 403 response, generation of an alert, and stop processing the HTTP request). Application Layer Controls are grouped into higher level groupings for a classification of attacks, e.g., based on ModSecurity or other rulesets. Within each classification, preferably several specific detection rules exist.

Customers can choose to apply only the specific rules they choose to select and configure each rule to either alert, deny, or take other action.

Network Layer Controls define the IP restrictions, for example, that are to be applied to the site. Requests from particular IP addresses can be blocked and/or allowed, or a strict black list/white list may be applied. Multiple IP addresses may be specified using CIDR notation.

Real-Time Reporting defines the URL, through a CDN-served digital property, to which the edge server process (ghost) will POST data based on the rule(s) that were triggered. The CDN may include a server e-mail-based log delivery service (LDS) that reports data to the CDN customer. The CDN LDS may include options to add fields for W3C and Combined formats. To provide more real-time information to the CDN customer, Real-Time Reporting is used send CF specific data to customers quickly. As the data is sent as a POST, the customer can create the POST processing application to react in any way appropriate for their needs, such as either immediately generating alerts or only alert if X alerts are generated in Y minutes.

It is useful to note the distinction between activation/deactivation of a firewall instance and enabling/disabling of rules processing within that instance. Activation/deactivation should occur infrequently—only when a firewall instance is first created or deleted. Activation/deactivation controls the process of including/removing the reference to the CF data file, e.g., within a larger metadata configuration file (that may include other control information for the content server ghost process). Preferably, it involves modifying/deploying the ghost metadata file (that includes such other control information).

On the other hand, enabling/disabling of rules processing within an activated firewall instance is controlled by the a status metadata tag contained in the configuration file. Modifying/deploying a configuration file is intended to be a quicker process than modifying/deploying the ghost metadata file, preferably using a communication channel (from the portal to the content servers) that is dedicated for this purpose. In this way, enabling/disabling of rules processing can occur more frequently (if need be). Disabling causes the rules to be ignored until reactivated (the rules will still be on the content server but not executed until re-enabled). Fast delivery of firewall configuration thus preferably uses a dedicated metadata channel to carry per-customer configuration file that references the selected Core Rule Set rules and IP blocking rules for all the customer firewall instances.

2.4 Match Targets

A Match Target represents specific criteria that indicate the firewall rules should be applied. If a URL matches a Match Target, the specified Firewall Instance will be applied and the Application Layer Controls and/or the Network Layer Controls, as selected for the Match Target.

Match Targets require a CDN customer digital property (e.g., a customer domain, sub-domain, or the like) and at least one other standard URI match criteria: Path, Default 2.5 Master Configuration File The master metadata configuration file for the digital property has the CF module enabled through an Optional Features option before the CF rules configuration file will be used, regardless of the Match Targets.

The CF rules configuration is "inserted" into the master configuration file dynamically using a tag, such as <akamai:insert> tag. When the CF Optional Feature is enabled, the <akamai:insert> tag is inserted into the beginning of the customer site metadata (See, U.S. Pat. No. 7,240,100) with the appropriate tags to identify the CF rules configuration file. As a security requirement when the CF module is enabled, ghost to ghost (G2G) authentication is enabled.

2.6 Metadata Structure

FIG. 8 illustrates metadata encoding two exemplary rules that activate a firewall when certain criteria are met. Several tags and features are included in the metadata structure so that a CDN content server process (e.g., ghost) can support the rule set processing.

In the example in FIG. 8, both actions are inside <match:regex>, but any match or combination of matches could actually be used. The tag <akamai: fw-rules> is used to group the firewall rules together.

The following terminology can be used:

| Name | Definition |
| --- | --- |
| Firewall metadata | Any block of metadata enclosed inside <akamai:firewall-config> |
| Firewall rule | Combination of one of more matches, and an action. Rules must belong to firewall metadata. |
| Firewall action | Metadata that defines what is done when the rule is triggered. |

2.6.1 Metadata Controls

The CF feature is controlled with the following metadata control tags. In this embodiment, it is set in the beginning of the metadata file, before any firewall metadata is encountered.

| Tag | Type | Default | Description |
| --- | --- | --- | --- |
| security:firewall.off | flag | off | This is a baseline switch to globally disable the cloud firewall feature across all customers in case we detect a critical bug. |
| security: firewall.activate | flag | off | Enable/disable the cloud firewall feature. If disabled, firewall metadata is ignored. |
| security: firewall.id | string | N/A | Application ID. This is only used for reporting. |
| security: firewall.debug.activate | flag | off | Turn debugging on/off. See paragraph about debugging. |
| security: firewall.debug.max-limit | Integer | 10 | Maximum number of lines per second in cache.log |
| security: firewall.debug.respect-xff | flag | off | This is useful for debugging. |

File, and File Extensions. Once all match criteria are evaluated, the content server process (ghost) running CF will know if a firewall instance is to be applied and the controls within that instance that are to be applied.

2.6.2 Actions

Actions are defined with <security: firewall.action>, which is a listable node. The <security: firewall.action> node can contain any of these tags:

| Tag | Type | Default | Description |
| --- | --- | --- | --- |
| id | string | N/A | Identifier for the rule. This is a mandatory parameter. If the deny flag is on, the built-in variable AK_FIREWALL_DENY_RULEID contains this identifier. |

-continued

| Tag | Type | Default | Description |
|---|---|---|---|
| reject | flag | off | If the value is off, ghost produces a warning but the control flow of the request is not modified. If the value is on, ghost stops evaluating other rules and the client request gets denied. |
| msg | string | Empty string | Error message for the action. Displayed in logs. |
| tag | string | Empty string | Tag used to categorize the rule. Displayed in logs. |
| data | string | Empty string | User data associated with the action. Displayed in the logs. This tag is optional. It is typically used to show what part of the input matched a regular expression. |
| http-status | integer | 403 | Used when deny is "on" to decide what error page to return to the client. It needs to be in the 400-599 range. |

Firewall metadata is executed if the Cloud Firewall is turned on. If an action has the deny flag on, the control flow resumes after the firewall metadata. Once metadata is applied for the stage, the edge server ghost will return an error page to the user with the error status code from the action.

3.0 Firewall Request Processing

Figure 9:
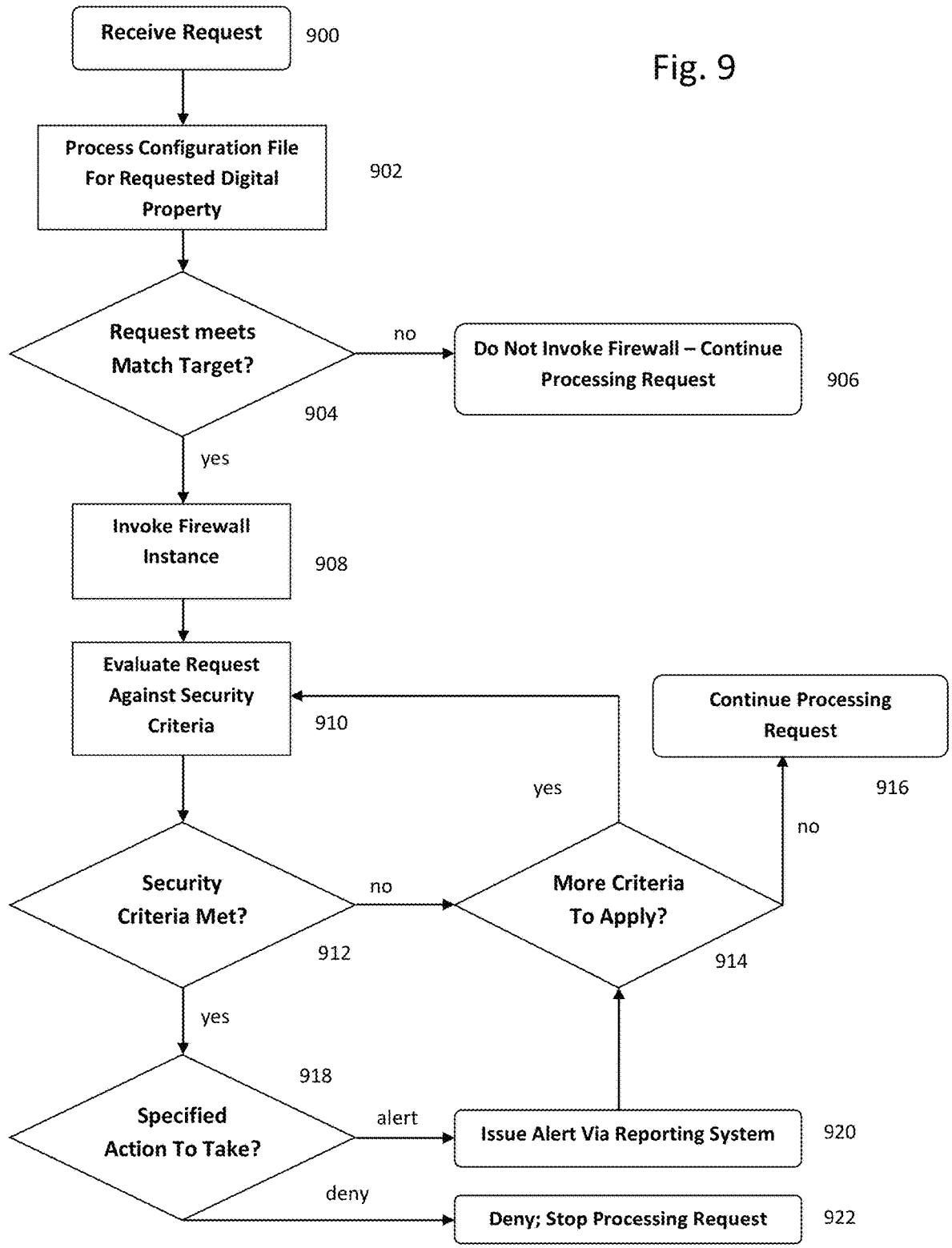
FIG. 9 is a flow chart illustrating operation of a configured firewall in accordance with one embodiment of the invention.

FIG. 9 illustrates the processing of a request by a firewall, which in many implementations is running in or in conjunction with a content server. In step 900, a request is received. When a request is made to a CDN content server (or more particularly, to a ghost process executing in that server), the digital property is evaluated to determine the appropriate configuration file to use with the request. (See, U.S. Pat. No. 7,240,100.)

In step 902, the master configuration file for that digital property is retrieved and evaluated. The CF rules configuration (e.g., metadata in XML format or otherwise) is inserted into the master metadata configuration file using the <akamai:insert> tag. (In other embodiments, the CF rules configuration file may be evaluated separately, or other means of communicating the desired firewall configuration may be used.)

In step 904, the CF Match Targets specified in the configuration are evaluated to determine if a Firewall Instance is to be invoked. For example, the request may be tested against the Match Target criteria shown in FIG. 7, above, to determine if is for content from a matching domain, subdomain, has matching file extension, and so on. If none of the criteria are met, meaning that the customer configured the firewall not to activate for requests for such content, then the firewall does not need to be invoked and CF is done. The ghost process evaluates the rest of the master configuration file and the request continues to be processed accordingly. In response to the request, for example, the content server may serve content from its cache or retrieve such content from the origin server for delivery to the requestor.

If the request matches a Match Target, then in steps 910-914 the firewall instance is invoked to evaluate the request against the security criteria. If the request does not meet any of the security criteria, then the request clears the firewall and continues to be processed as normal, and in accordance with other instructions in the master configuration file. (Step 916.) This processing may result in a content server in the CDN serving the requested content from its cache, or retrieving it from an origin server for delivery to the requestor.

If an enabled rule condition triggers a security condition, then the firewall takes action. The action to be taken is specified in the rules configuration file. (See, FIG. 5.) For example, in "Alert Only" mode, the alert is noted/logged with the rule that trigged the alert, and the CF rules continue to be processed against the request. (Steps, 918, 920.) In "Deny" mode, the alert is noted/logged, and processing of the CF rules and the configuration file is stopped. (Steps 918, 922.) If any "alert" or "deny" actions were detected, Real-Time Reporting will be activated if it is configured. Logs/reports of detected attacks, actions taken, or other information related to the firewall module is communicated to the user via the portal (extranet).

4.0 Implementation

The clients, servers, and other devices described herein may be implemented on conventional computer systems, as modified by the teachings hereof, with the functional characteristics described above realized in software, hardware, or a combination thereof.

Software may include one or several discrete programs. Any given function may comprise part of any given module, process, execution thread, or other such programming construct. Generalizing, each function described above may be implemented as computer code, namely, as a set of computer instructions, for performing the functionality described via execution of that code using conventional means, e.g., a processor, a computer, a machine, a system, digital data processing device, or other apparatus.

Figure 10:
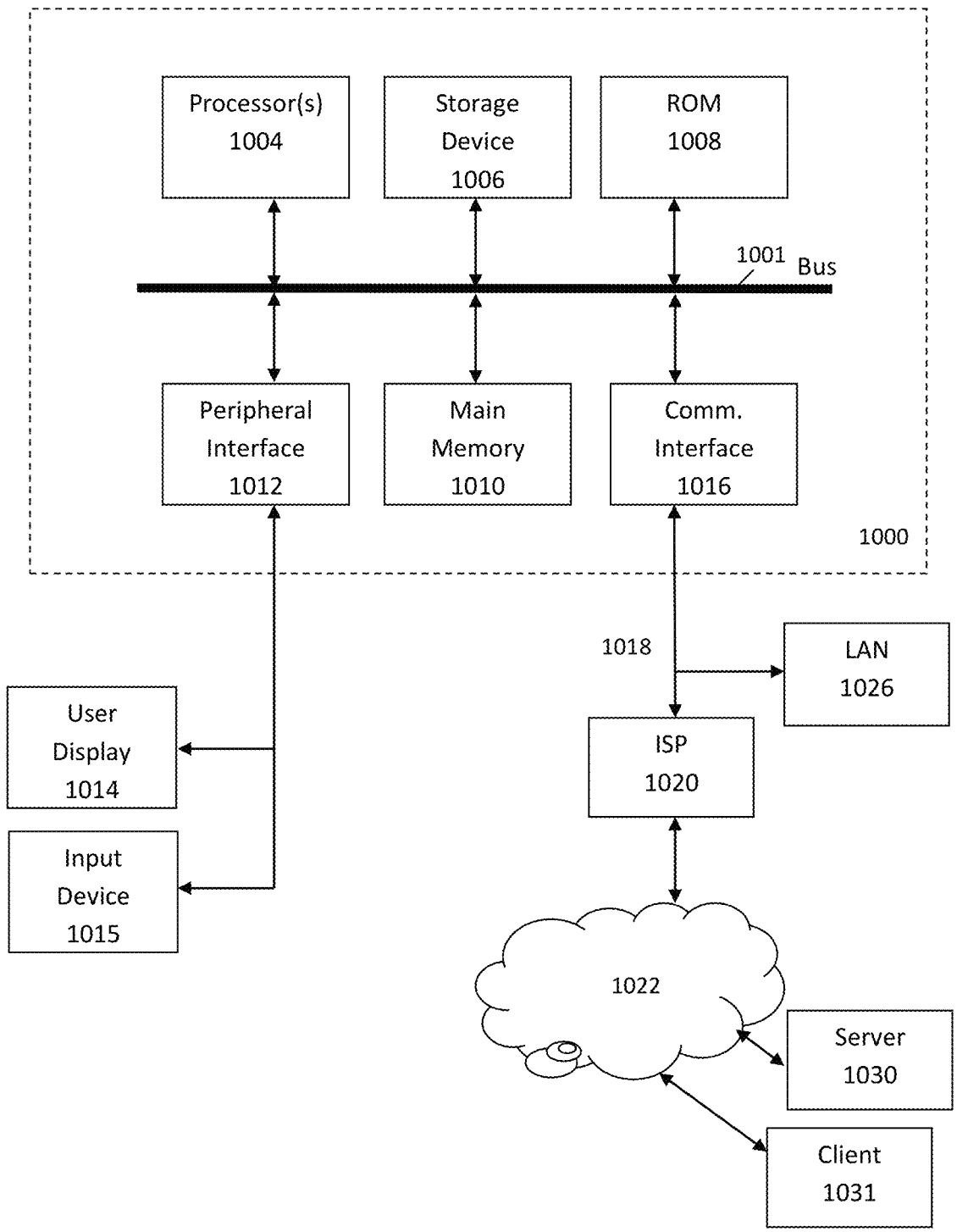
FIG. 10 is a simplified block diagram of a computer system with which the present invention may be implemented.

FIG. 10 is a block diagram that illustrates hardware in a computer system 1000 upon which such software may run in order to implement embodiments of the invention. The computer system 1000 may be embodied in a client device, server, personal computer, workstation, tablet computer, wireless device, mobile device, network device, router, hub, gateway, or other device.

Computer system 1000 includes a processor 1004 coupled to bus 1001. In some systems, multiple processor and/or processor cores may be employed. Computer system 1000 further includes a main memory 1010, such as a random access memory (RAM) or other storage device, coupled to the bus 1001 for storing information and instructions to be executed by processor 1004. A read only memory (ROM) 1008 is coupled to the bus 1001 for storing information and instructions for processor 1004. A non-volatile storage device 1006, such as a magnetic disk, solid state memory (e.g., flash memory), or optical disk, is provided and coupled to bus 1001 for storing information and instructions. Other application-specific integrated circuits (ASICs), field programmable gate arrays (FPGAs) or circuitry may be included in the computer system 1000 to perform functions described herein.

A peripheral interface 1012 communicatively couples computer system 1000 to a user display 1014 that displays the output of software executing on the computer system, and an input device 1015 (e.g., a keyboard, mouse, trackpad, touchscreen) that communicates user input and instructions to the computer system 1000. The peripheral interface 1012 may include interface circuitry, control and/or level-shifting logic for local buses such as RS-485, Universal Serial Bus (USB), IEEE 1394, or other communication links.

Computer system 1000 is coupled to a communication interface 1016 that provides a link (e.g., at a physical layer, data link layer, or otherwise) between the system bus 1001 and an external communication link. The communication interface 1016 provides a network link 1018. The communication interface 1016 may represent a Ethernet or other network interface card (NIC), a wireless interface, modem, an optical interface, or other kind of input/output interface.

Network link 1018 provides data communication through one or more networks to other devices. Such devices include other computer systems that are part of a local area network (LAN) 1026. Furthermore, the network link 1018 provides a link, via an internet service provider (ISP) 1020, to the Internet 1022. In turn, the Internet 1022 may provide a link to other computing systems such as a remote server 1030 and/or a remote client 1031. Network link 1018 and such networks may transmit data using packet-switched, circuit-switched, or other data-transmission approaches.

In operation, the computer system 1000 may implement the functionality described herein as a result of the processor executing code. Such code is typically read from or provided by a non-transitory computer-readable medium, such as memory 1010, ROM 1008, or storage device 1006. Other forms of non-transitory computer-readable media include disks, tapes, magnetic media, CD-ROMs, optical media, RAM, PROM, EPROM, and EEPROM. Any other non-transitory computer-readable medium may also be employed. Executing code may also be read from network link 1018 (e.g., following temporary storage in an interface buffer, local memory, or other circuitry).

What is claimed is:

1. A method of content delivery in a content delivery network (CDN) operated by a content delivery network service provider (CDNSP) on behalf of a plurality of participating content providers, wherein the plurality of participating content providers have content delivered via the CDN, the CDN having a plurality of CDN servers deployed around the Internet at an edge, the edge being any of in and adjacent to an end user access network, the method comprising:

the CDNSP providing a user interface through which a particular participating content provider any of: creates and selects a first firewall instance for the plurality of CDN servers, which are deployed around the Internet at the edge, to apply to network traffic associated with the particular participating content provider, the network traffic comprising requests for content of the particular participating content provider, the content to be delivered via the CDN;

the user interface further enabling the particular participating content provider to any of: create and select a second firewall instance for the plurality of CDN servers, which are deployed around the Internet at the edge, to apply to network traffic associated with the particular participating content provider, the network traffic comprising requests for content of the particular participating content provider, the content to be delivered via the CDN;

the first firewall instance comprising:
  (i) a first application layer control, which comprises one or more security criteria to be checked against a request and an action to take if an attack is identified;
  (ii) a first network layer control, which comprises one or more IP-layer restrictions to apply to requests from particular IP addresses; and
  (iii) a designation of a first set of one or more of the plurality of CDN servers to which the first firewall instance will apply;

the second firewall instance comprising:
  (i) a second application layer control, which comprises one or more security criteria to be checked against a request and an action to take if an attack is identified;
  (ii) a second network layer control, which comprises one or more IP-layer restrictions to apply to requests from particular IP addresses; and,
  (iii) a designation of a second set of one or more of the plurality of CDN servers to which the second firewall instance will apply, the second set being different than the first set.

2. The method of claim 1, wherein the one or more security criteria in the first application layer control comprise any of: one or more selected rules from a ruleset, and, a rule authored by a user with a Boolean expression.

3. The method of claim 1, wherein the one or more security criteria comprises: a rule authored by a user with a Boolean expression.

4. The method of claim 1, wherein one or more the IP-layer restrictions comprises any of: a whitelist, a blacklist.

5. A system comprising a content delivery network (CDN) operated by a content delivery network service provider (CDNSP) on behalf of a plurality of participating content providers, wherein the plurality of participating content providers have content delivered via the CDN, the CDN having a plurality of CDN servers deployed around the Internet at an edge, the edge being any of in and adjacent to an end user access network, the system further comprising:

the plurality of CDN servers; and, a user interface through which a particular participating content provider any of: creates and selects a first firewall instance for the plurality of CDN servers, which are deployed around the Internet at the edge, to apply to network traffic associated with the particular participating content provider, the network traffic comprising requests for content of the particular participating content provider, the content to be delivered via the CDN;

the user interface further enabling the particular participating content provider to any of: create and select a second firewall instance for the plurality of CDN servers, which are deployed around the Internet at the edge, to apply to network traffic associated with the particular participating content provider, the network traffic comprising requests for content of the particular participating content provider, the content to be delivered via the CDN;

the first firewall instance comprising:
  (i) a first application layer control, which comprises one or more security criteria to be checked against a request and an action to take if an attack is identified;
  (ii) a first network layer control, which comprises one or more IP-layer restrictions to apply to requests from particular IP addresses; and
  (iii) a designation of a first set of one or more of the plurality of CDN servers to which the first firewall instance will apply;

the second firewall instance comprising:
- (i) a second application layer control, which comprises one or more security criteria to be checked against a request and an action to take if an attack is identified;
- (ii) a second network layer control, which comprises one or more IP-layer restrictions to apply to requests from particular IP addresses; and,
- (iii) a designation of a second set of one or more of the plurality of CDN servers to which the second firewall instance will apply, the second set being different than the first set.

6. The system of claim 5, wherein the one or more security criteria in the first application layer control comprise any of: one or more selected rules from a ruleset, and, a rule authored by a user with a Boolean expression.

7. The system of claim 5, wherein the one or more security criteria comprises: a rule authored by a user with a Boolean expression.

8. The system of claim 5, wherein one or more the IP-layer restrictions comprises any of: a whitelist, a blacklist.

\* \* \* \* \*